(12) United States Patent
Diaz et al.

(10) Patent No.: US 11,732,366 B2
(45) Date of Patent: Aug. 22, 2023

(54) CHEMICAL PROCESSING OF ADDITIVE MANUFACTURED WORKPIECES

(71) Applicant: REM TECHNOLOGIES, INC., Southington, CT (US)

(72) Inventors: Agustin Diaz, College Station, TX (US); Gary J. Sroka, Missouri City, TX (US)

(73) Assignee: REM TECHNOLOGIES, INC., Southington, CT (US)

( * ) Notice: Subject to any disclaimer, the term of this patent is extended or adjusted under 35 U.S.C. 154(b) by 717 days.

(21) Appl. No.: 16/077,976

(22) PCT Filed: Feb. 15, 2017

(86) PCT No.: PCT/US2017/017849
§ 371 (c)(1),
(2) Date: Aug. 14, 2018

(87) PCT Pub. No.: WO2017/142882
PCT Pub. Date: Aug. 24, 2017

(65) Prior Publication Data
US 2019/0145010 A1 May 16, 2019

Related U.S. Application Data

(60) Provisional application No. 62/295,278, filed on Feb. 15, 2016.

(51) Int. Cl.
*C23F 1/14* (2006.01)
*C23F 3/00* (2006.01)
*B33Y 40/20* (2020.01)
*C09G 1/02* (2006.01)
*C09K 3/14* (2006.01)
(Continued)

(52) U.S. Cl.
CPC ............... *C23F 3/00* (2013.01); *B33Y 40/20* (2020.01); *C09G 1/02* (2013.01); *C09K 3/1463* (2013.01);
(Continued)

(58) Field of Classification Search
CPC ..... C23F 3/00; C23F 1/00; C09G 1/02; C09G 1/00; C09K 3/1463; B23P 2700/06;
(Continued)

(56) References Cited

U.S. PATENT DOCUMENTS

| 6,575,817 B2 | 6/2003 | Czech |
| 9,114,032 B1 | 8/2015 | Pulugurtha |

(Continued)

FOREIGN PATENT DOCUMENTS

| DE | 102009048665 A1 | 3/2011 |
| DE | 102010046579 A1 | 3/2012 |

(Continued)

OTHER PUBLICATIONS

Korobe et al. ("High Speed Slurry Flow Finishing of Inner Wall of Stainless Steel Capillary" Int. J. Japan Soc. Prec. Eng., vol. 32, No. 1 (Mar. 1998)) (Year: 1998).*

(Continued)

*Primary Examiner* — Thomas T Pham
(74) *Attorney, Agent, or Firm* — Foley & Lardner LLP (57) ABSTRACT

A method for chemical processing an internal cavity of an additive manufactured (AM) metal workpiece is disclosed in which a connector is provided in fluid connection with the internal cavity and a chemical polishing solution is flowed through the connector and the internal cavity to process the internal cavity to a desired finish.

15 Claims, 5 Drawing Sheets

(51) Int. Cl.
  *B23H 9/00* (2006.01)
  *B33Y 80/00* (2015.01)
(52) U.S. Cl.
  CPC .......... *B23H 9/001* (2013.01); *B23P 2700/06* (2013.01); *B33Y 80/00* (2014.12)
(58) Field of Classification Search
  CPC ........ B23H 9/001; B33Y 40/00; B33Y 80/00; H01L 21/32115
  See application file for complete search history.

(56) References Cited

U.S. PATENT DOCUMENTS

| | | | |
|---|---|---|---|
| 10,221,488 | B2 | 3/2019 | Gold |
| 2006/0251477 | A1* | 11/2006 | Brower ............... E21B 43/0122 405/63 |
| 2007/0203584 | A1 | 8/2007 | Bandyopadhyay et al. |
| 2008/0087540 | A1 | 4/2008 | Gosger et al. |
| 2015/0167455 | A1* | 6/2015 | Irani ..................... E21B 49/081 73/152.23 |
| 2015/0197862 | A1 | 7/2015 | Engel et al. |
| 2016/0052057 | A1 | 2/2016 | Xu |
| 2016/0265701 | A1* | 9/2016 | Greig ..................... E21B 19/22 |
| 2017/0232670 | A1* | 8/2017 | Joerger ................ B29C 64/153 264/497 |

FOREIGN PATENT DOCUMENTS

| | | |
|---|---|---|
| DE | 102011101857 A1 | 11/2012 |
| EP | 1683593 A2 | 7/2006 |
| EP | 2319641 A1 | 5/2011 |
| JP | 2002322501 A | 11/2002 |
| JP | 3454636 B2 | 7/2003 |
| JP | 2004027329 A | 1/2004 |
| JP | 2010-047779 A | 3/2010 |
| JP | 2013-170500 | 9/2013 |
| JP | 2015-030897 A | 2/2015 |
| JP | 2017-057500 A | 3/2017 |
| WO | WO 90/05039 A1 | 5/1990 |
| WO | WO 02/062528 A2 | 8/2002 |
| WO | WO-2013/137283 A1 | 9/2013 |
| WO | WO-2015/181080 A1 | 12/2015 |
| WO | WO-2016/012399 A1 | 1/2016 |

OTHER PUBLICATIONS

International Search Report issued in PCT/US2017/017849, dated May 29, 2017.
Written Opinion of the International Searching Authority issued in PCT/US2017/017849, dated May 29, 2017.

* cited by examiner

CHEMICAL PROCESSING OF ADDITIVE MANUFACTURED WORKPIECES

CROSS-REFERENCE TO RELATED APPLICATIONS

This application is the National Phase of International Patent Application No. PCT/US2017/017849, filed Feb. 15, 2017, published on Aug. 24, 2017 as WO 2017/142882 A1, which claims priority to U.S. Provisional Application No. 62/295,278, filed Feb. 15, 2016. The contents of these applications are herein incorporated by reference in their entirety.

FIELD OF THE INVENTION

The present invention relates to processing and finishing of additive manufactured (AM) metal workpieces such as 3-D printed workpieces and the like. In particular, it relates to chemical processing of internal cavities of such workpieces.

BACKGROUND ART

Additive Manufactured (AM) metal workpieces are often designed and manufactured with complex internal cavities (i.e. passageways, blind holes, etc.) having critical geometries, sometimes with cross-sectional areas of less than 1 $mm^2$. Some examples of such work pieces include, but are not limited to: jet engine fuel nozzles, nozzles, atomizers, impellers, propellers, rotor assemblies, turbine blades, exhaust manifolds, exhaust pipes, gas diffusers, flow manifolds, flow valve manifolds, stationary serpentine passages, heat exchangers, pipe elbows, coil pipes and mandrels. These internal cavities, including blind holes, often have metal debris, such as accumulation of partially melted/sintered powder, loose powder and the like from the building process. The metal debris in these internal cavities can cause clogging of the cavities, ruining the intended purpose of the cavity. Or, the presence of the metal debris can diminish the intended functionality of the cavity. This internal metal debris must be removed to improve biocompatibility, fluid dynamics and fluid mechanics, and/or other functional properties of the cavity.

The surface roughness of AM internal cavities often needs to be reduced in order to meet their intended functions. Mechanical finishing methods such as abrasive grinding, abrasive flow machining, internal magnetic abrasive finishing, fluidized bed machining and the like cannot always successfully reduce the surface roughness of the internal cavities. And these mechanical techniques can result in residual debris left inside the cavities which require subsequent removal.

AM parts often have significant variances in the levels of surface roughness and the quantities of metal debris present from part to part even if they are built to the same build parameters and in the same machine. These variances must be accommodated for in designing the finishing process so as to ensure the desired result is achieved. The required reduced surface roughness and/or the complete removal of metal debris must be verified to ensure that the part is fit for use. Post-processing checks can result in the need to repeat the processing of a part or parts, which is an undesirable outcome. Relying on pre-processing evaluation of each part is also unduly laborious.

Often the AM design and manufacturing process requires the use of temporary support structures to make the workpiece fabrication feasible. These temporary support structures are removed as part of the final condition of the workpiece. The designer must limit the usage of the support structures to locations where current techniques, such as abrasive machining, can be used to remove them. This is an undesirable limitation when designing complex, convoluted internal cavities and/or recessed surfaces.

Similarly, the design and manufacture of AM workpieces with internal cavities can be done such that the dimensions of the internal cavity are purposefully undersized such that subsequent machining by the present invention not only removes the metal debris and temporary support structures, but achieves the desired internal dimensions.

This invention achieves the removal of metal debris, the reduction of surface roughness, and removal of temporary support structures from internal cavities and support structures form recessed surfaces. The apparatus designed to carry out this invention is also part of this invention. The design and resulting workpieces, where the limitation of the usage of the temporary support structures has been eliminated, is also part of this invention. The methods and apparatus for monitoring the part finishing, temporary support structure removal and metal debris removal in-process are also a part of this invention.

Summary of Problems

In summary, existing AM processes and workpieces exhibit a number of problems that may include some or more of the following:
1. The surfaces of the internal cavities have a rough surface texture and are lined with loose powder and partially melted/sintered metal powder attached to the surface.
2. During the building process, temporary support structures are often used in internal cavities and recessed surfaces having a cross section greater than 3 mm to increase heat transfer and mechanical stability. These supports must be removed after printing, which is difficult or impossible with traditional mechanical techniques when the cavities are narrow and/or follows a tortuous route.
3. The surface finishing needs to be uniform over the entire surface of the internal cavity, and the supports need to be completely removed.
4. The cross-sectional area of the internal cavities can be very small, sometimes even less than 1 $mm^2$.
5. The interior cavities of an AM built part can follow a tortuous route.
6. Consequently, the interior surfaces of the cavities often cannot be reached with mechanical machining tools.
7. Forcing abrasives through the internal cavity, such as with abrasive flow machining, can result in non-uniform stock and temporary supports removal, and hence poor surface finishing, due to the deviation from a linear pathway through the cavity. Also, use of abrasive machining techniques can result in residual debris in the internal cavity requiring subsequent cleaning.
8. The stock removal process must be controllable, measurable, and repeatable.

SUMMARY OF THE INVENTION

According to the present invention, a method of surface finishing the interior cavity surfaces, of removing metal debris and of removing temporary support structures, is disclosed for AM workpieces using chemical polishing. This method allows a number of the above identified aims to be achieved and overcomes at least some of the highlighted problems.

Nevertheless, it may be noted that the technology also has challenges. In particular, the chemical polishing chemistry is very corrosive, and the process sometimes needs to be carried out at an elevated temperature. Small and tortuous cavities cannot be easily inspected making monitoring and controlling the degree of finishing very challenging. Often gas evolution occurs during the chemical polishing process. Trapped gas bubbles prevent the chemical polishing chemistry from uniformly contacting all internal surfaces.

It should also be noted that simply immersing the part in a chemical polishing solution will not work since dead spaces will occur in the internal cavities, and the evolved gas bubbles will prevent uniform chemical contact. In addition, the chemical concentration and the temperature will vary throughout the cavity resulting in non-uniform stock removal.

A number of the problems addressed by the present invention may be summarized as follows:
1. Chemical polishing formulations are very corrosive and pose serious health, safety and environmental (HS&E) concerns; these concerns must be mitigated.
2. The chemical polishing solution and the work-piece must be kept at an essentially constant temperature, through the whole internal cavity at all time.
3. Trapped gas bubbles must be eliminated.
4. The chemical concentration must remain essentially uniform throughout the cavity.
5. A routine method is needed to calculate the stock removal, temporary support structure removal, and/or to ensure the metal debris are removed and the required surface roughness is obtained.
6. A method of monitoring the rate of stock removal, temporary support structure removal, and/or ensuring the metal debris are completely removed while in process is required to:
    a. Reduce or eliminate post-process quality checks which, if failed, would require reprocessing (leading to inefficiency or processing).
    b. Accommodate the variability in surface roughness, temporary support size, and the quantity or metal debris present that is inherent to AM parts thereby reducing or eliminating pre-processing inspections (leading to efficiency of processing).
7. A method of making a leak free tubing connection that carries the active chemistry through the cavity inlets and outlets openings of the workpiece.
8. A method where the design and manufacture of the AM internal cavities are undersized such that the subsequent inventive process will remove the metal debris, remove the temporary support structures and increase the internal dimensions to the desired final dimensions.

SHORT DESCRIPTION OF DRAWINGS

The present invention will be discussed in more detail below, with reference to the attached drawings, in which.

DESCRIPTION OF THE ILLUSTRATED EMBODIMENTS

Figure 1A:
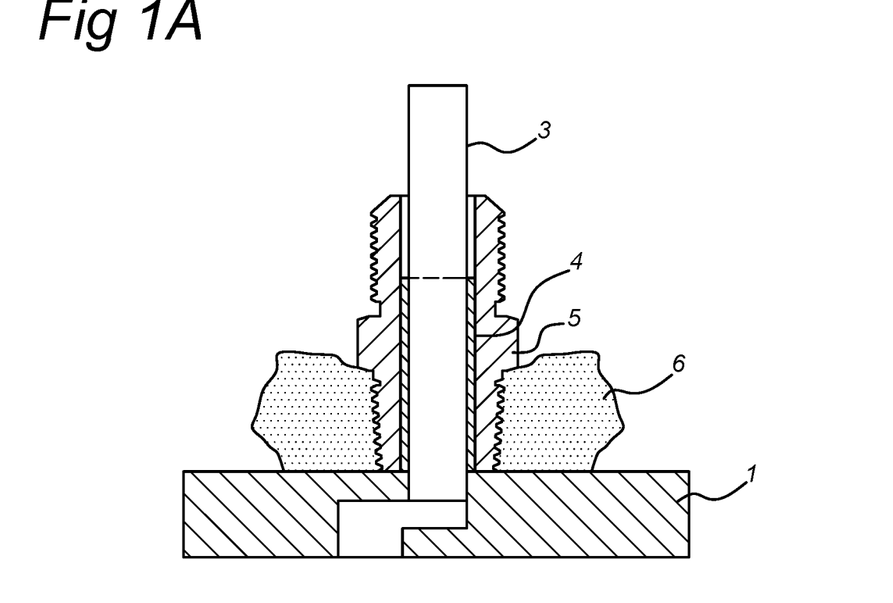
FIG. 1A and FIG. 1B illustrate schematically the attachment of a connector to a cavity in a workpiece according to an aspect of the present invention.
Figure 1B:
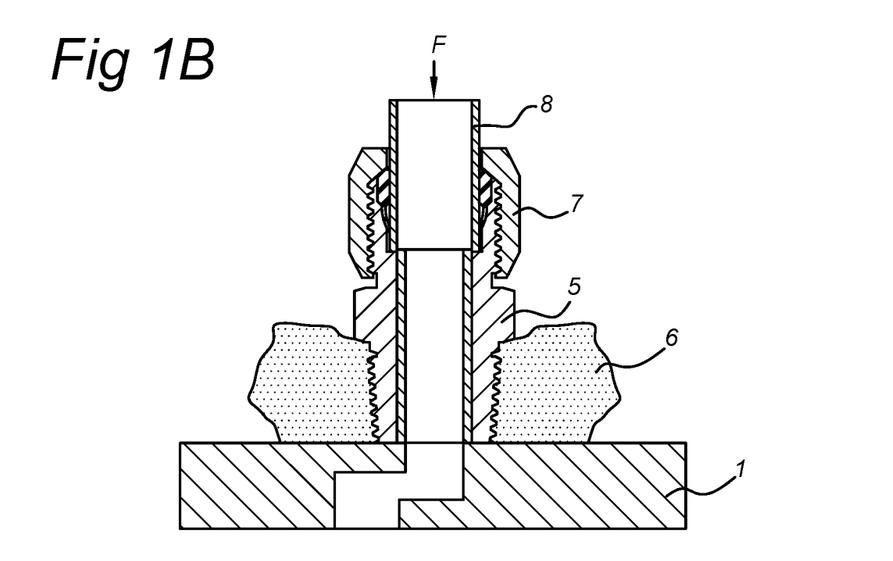
Figure 2A:
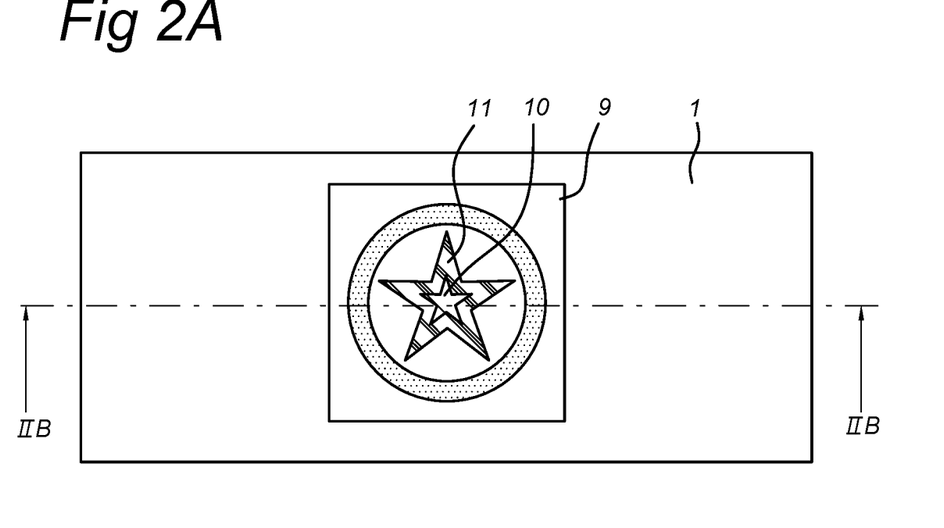
FIGS. 2A and 2B illustrate in plan and side views a first embodiment of a connection to a cavity having an irregular form.
Figure 2B:
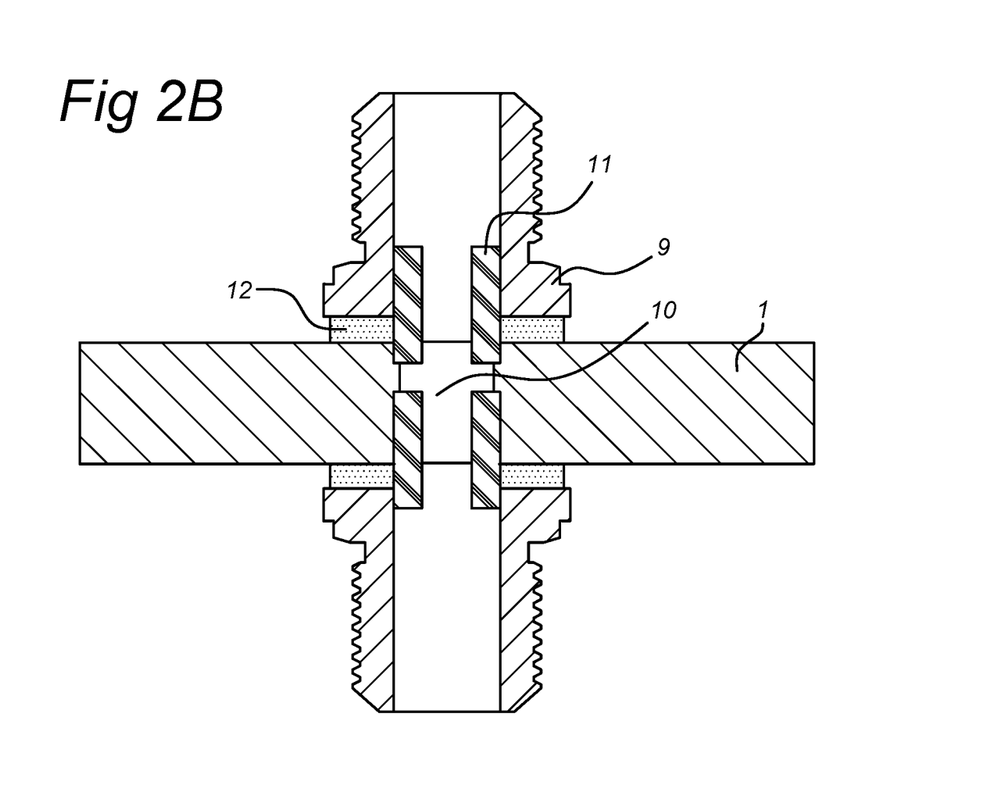
Figure 2C:
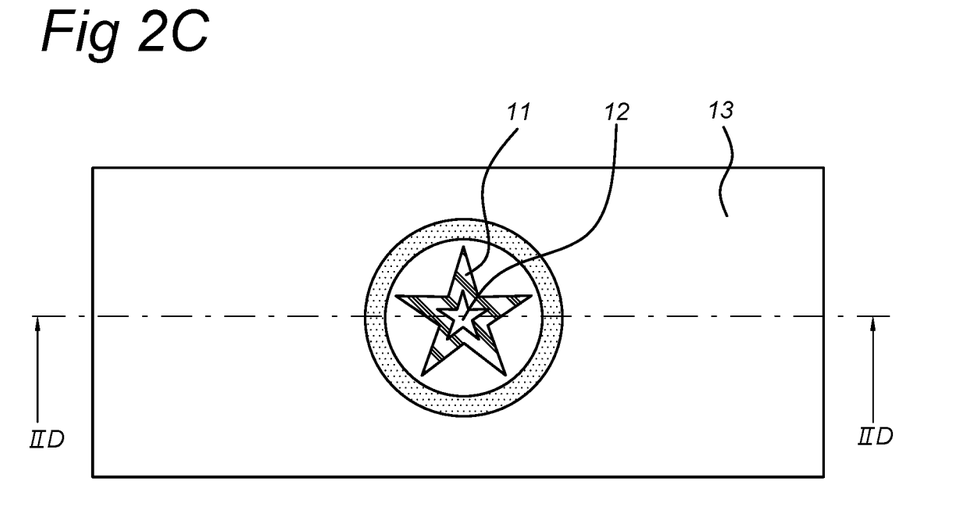
FIGS. 2C and 2D illustrate in plan and side views a second embodiment of a connection to a cavity having an irregular form.
Figure 2D:
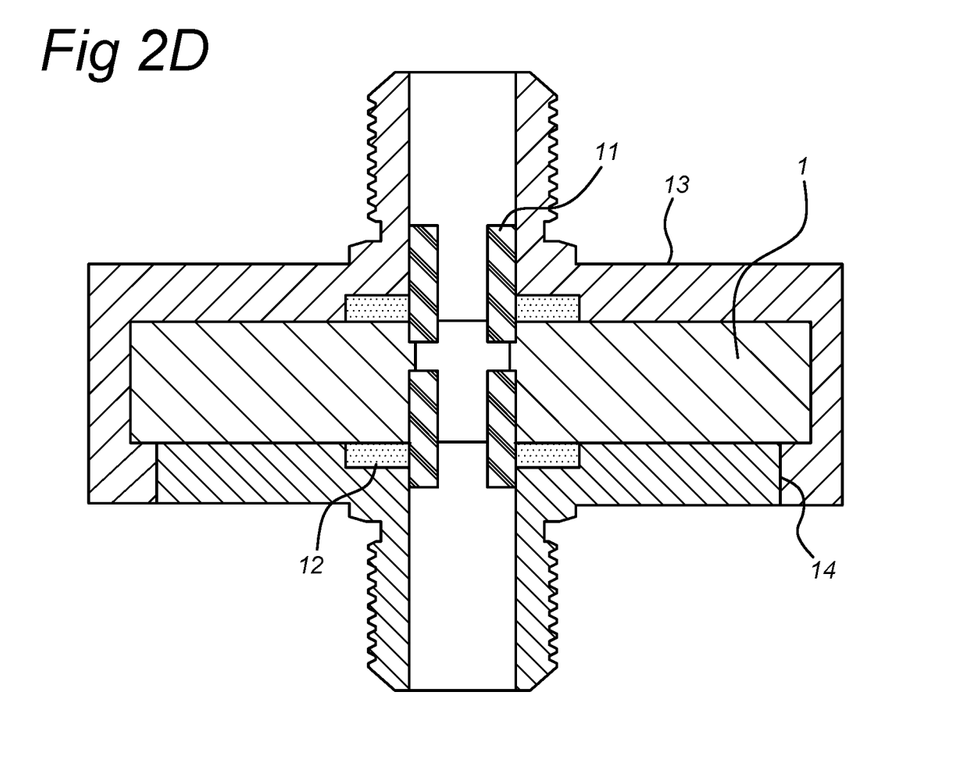
Figure 3:
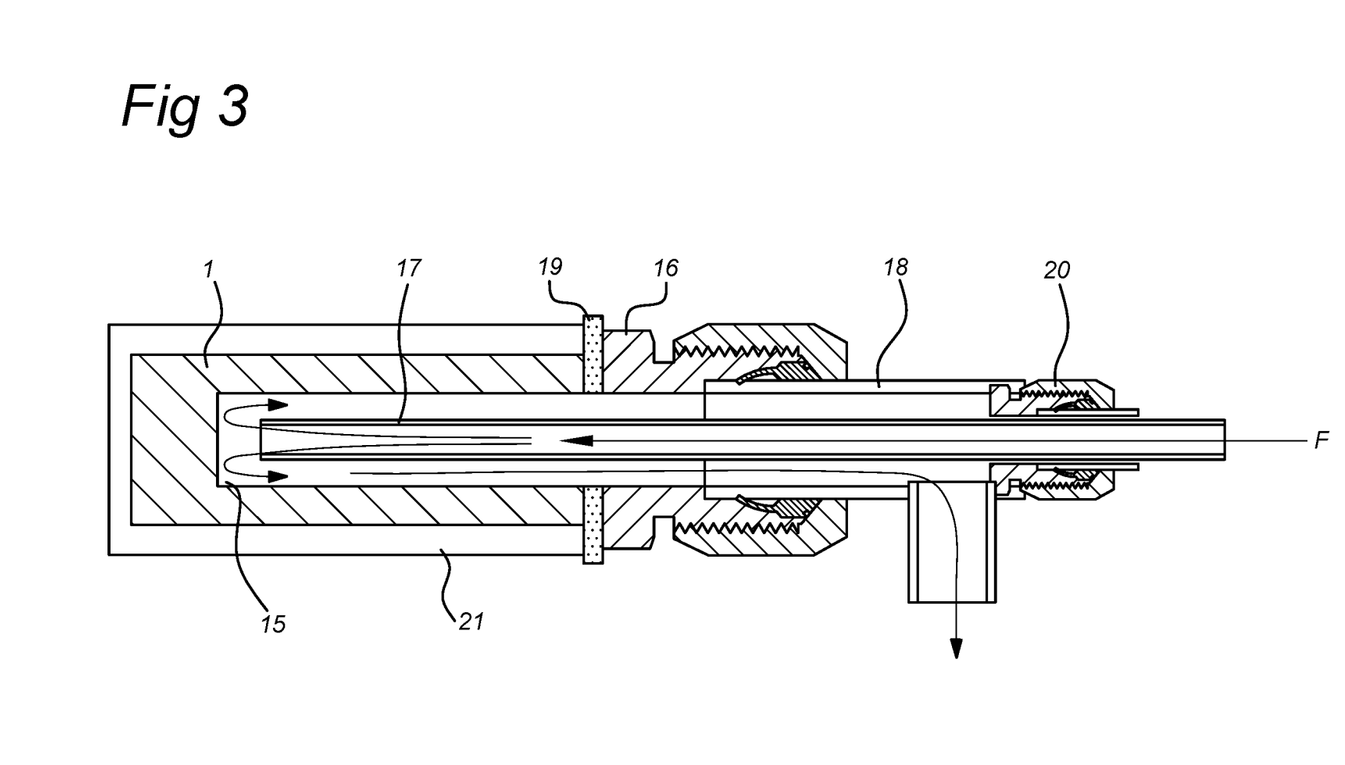
FIG. 3 illustrates schematically a connection to a blind hole cavity according to a further embodiment of the invention.

1. This invention pertains to the chemical polishing of all metals including but not limited to Titanium, Ti-6V-4Al, Nickel based alloys such as Inconel, Stainless Steels, Cobalt Chrome, Scalmalloy® alloys.
2. Chemical polishing solutions for the various alloys listed above can be found in literature, including: Voort. G F Vander 1999 Appendix G, Chemical Polishing Solutions Metallography Principles and Practice (ASM International) pp 552-61; and William T. Harris, 1976 Chemical Milling: Technology of Cutting Materials by Etching (Oxford Series on Advanced Manufacturing). The invention is of course not limited to published formulations. Examples of other possible chemical polishing solution per alloy that can be used, but not limited, are:
    Aluminum: 60 mL $H_2SO_4$ (96%)/30 mL $H_3PO_4$ (85%)/10 mL $HNO_3$ (65%)/@ 85° C.
    Stainless steel: [% by weight]: [30%] HCl (35%)/[40%] $H_2SO_4$ (96%)/[5.5%] titanium tetrachloride/0.5% $HNO_3$ (65%) [Optional]/BAL water/@ 70-80° C.
    Nickel: {% by vol}: {30%} $HNO_3$ (65%)/{10%} $H_2SO_4$ (96%)/{10%} $H_3PO_4$ (85%)/{50%}acetic acid (glacial)/@ 85-95° C.
    Inconel: Solution A=>30 g $CuCl_2$ 500 mL HCl (35%)/1000 mL $H_2O$
        Solution B=>60 mL acetic acid/40 mL $HNO_3$ (65%)/0.5 mL HCl
        Pump solution A first followed by solution B.
    Titanium: [% by vol] {50%} $HNO_3$ (65%)/{50%}HF (50%)
3. In most cases, it is vital that the connections to the ports of the internal cavities conform to their shape and size. Otherwise, either erosion or inadequate finishing will result. This may not apply when the ports are non-critical. In certain cases, temporary ports may be manufactured as part of the AM process and may be removed once processing of the internal cavity is completed. If this is not possible or desirable, ports may be joined to the workpiece by the following methods.
    a) If the cavity ports are cylindrical, the connection to the workpiece can be made as follows:
        i. FIG. 1A shows a workpiece 1 with a cavity opening 2, a wire or alignment object 3, a short tubing 4 (aligned to the cavity by wire 3), a generic tube fitting 5 (also aligned to the cavity by wire 3), and a sealant substance 6 (fixing all the tubing and fittings system to workpiece 1).
        ii. A wire or other cylindrical alignment object 3 with an outer diameter approximating the cavity's internal diameter is inserted into the cavity opening 2.

iii. Tubing 4 with an internal diameter closely approximating that of the cavity is used to enclose alignment object 3.
iv. A generic fitting body 5 is inserted surrounding tubbing 4 and wire 3.
v. Silicone rubber or another sealant 6 is molded against the fitting body 5 and the workpiece 1 to fix the tubing to the cavity opening 2 and the workpiece 1.
vi. After drying, the inserted wire or other object 3 is removed (FIG. 1B).
vii. A proper nut fitting 7 with the proper tubing 8 is connected to the generic fitting body union 5.
viii. Tubing 8 and 4 are long enough to make direct contact and press tightly in position one from the other.
ix. The chemical polishing solution is pumped F through tubing 8 into opening cavity 2.

b) If the cavity openings have an irregular shape, the connection to the workpiece can be made as follows:
i. FIG. 2A is a plan view of workpiece 1 with the connection fitting 9 made to fit into the opening cavity 10 with an irregular shape. FIG. 2B is a side view of a cross-section through the workpiece 1.
ii. The connection fitting 9 can be custom made by 3D printing, or any other machining or molding process, such that it conforms exactly to the shape of the irregular opening 10 in the workpiece 1. The dimensions may be based on the CAD model used for the workpiece.
iii. Connection fitting 9 has an alignment extension 11 at its base that fits into the cavity opening.
iv. The alignment extension 11 is made from a soluble polymer such that there is an extension beyond the base of the fitting that fits into the opening to ensure correct alignment into the cavity 10.
v. The alignment extension 11 is inserted into the opening and connection fitting 9 is glued with a sealing compound 12 to the workpiece 1.
vi. After the connection fitting 9 is firmly affixed to the workpiece 1, the interior soluble polymer of the alignment extension 11 is dissolved with a suitable solvent.
vii. Connection fitting 9 is fabricated with a suitable fitting at its upper end so that it can be easily connected to a nut fitting with a tube that will deliver the chemical polishing solution, such as the fitting 7 and tubing 8 presented in FIG. 1B.
viii. In FIGS. 2C and 2D, a more complex connecting arrangement is shown in similar views to those of FIGS. 2A and 2B. The connecting arrangement can be built to form a strap or jacket 13 around the workpiece 1 to secure the connection fittings 9 to the tubing system 8. The jacket 13 can be secured with a clip 14, or any other kind of securing system. The connection fitttings 9 may be integrally formed with the jacket 13 or connected thereto by mechanical means or by welding, adhesive or the like.

c) If the cavity opening is a blind hole (cavity), the connection to the workpiece can be made as follows:
i. FIG. 3 is a drawing showing a blind hole cavity 15 in workpiece 1, with the connection fitting 16 made to fit onto the opening of the blind hole cavity 15.
ii. The connection fitting 16 can be custom made by 3D printing, or any other machining or molding process, such that it conforms exactly to the shape and dimensions of the blind hole cavity 15 based on the CAD model.
iii. Connection fitting 16 is connecting a tube-in-tube configuration in which inner tube 17 (used as the inlet by which the chemical polishing solution will be pumped in) is a tube small enough to fit inside of the blind hole cavity 15, reaching the bottom of the cavity and leaving enough room with respect to the outer tube 18 (used as the outlet by which the chemical polishing solution will be pumped out) for free flowing F of the chemical polishing solution.
iv. The connection fitting 16 is adhered with a sealing compound 19 to the workpiece 1.
v. Connection fitting 16 is fabricated with a suitable fitting at its upper end so that it can be easily connected to a nut fitting 20 with outer tube 18, which will be connected to inner tube 17 that will deliver the chemical polishing solution.
vi. A more complex connecting fitting can be built to form a strap or a jacket 21 around the workpiece 1 to secure the connections 16 to the blind hole cavity 15. The jacket or strap 21 can also be secured with a clip, or any other kind of securing system, such as clip 14 presented in FIG. 2D.

Note: This tube-in-tube configuration for blind cavities also applies to the connection configurations described in Example a (FIG. 1) and Example b (FIG. 2) of this section, or any minor modifications thereof.

Figure 4:
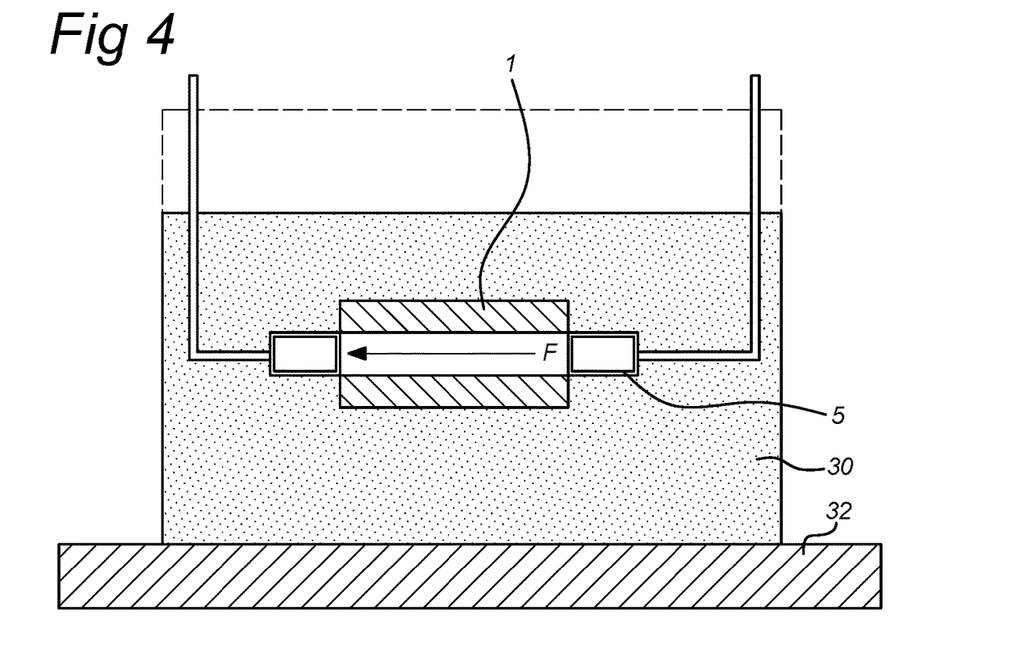
FIG. 4 illustrates schematically a heated buffer bath in which the invention may be performed.
Figure 5:
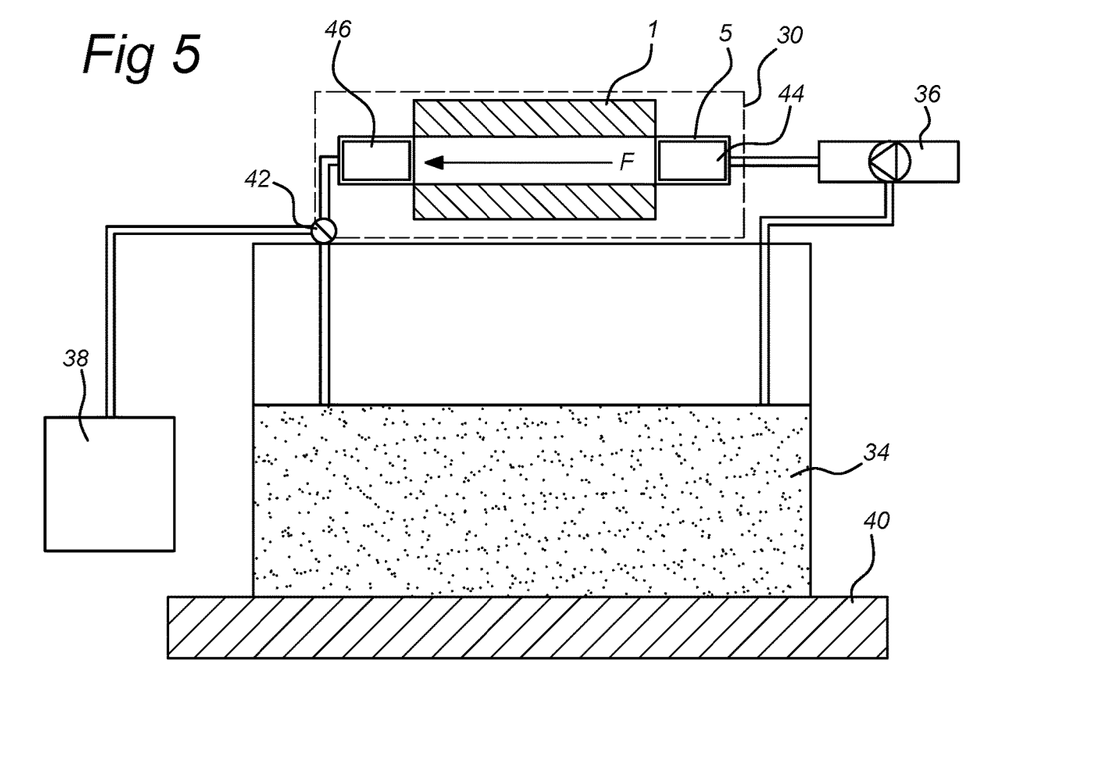
FIG. 5 illustrates schematically an apparatus for carrying out the invention.

4. The workpiece 1 with its fittings 5 and attached tubings 8, is immersed in a heated buffer bath 30 as shown in FIG. 4. The buffer bath 30 is maintained at approximately the same temperature as that of the polishing chemistry solution by heating and stirring plate 32. Preferentially, the solution of the buffer bath 30 has a pH close to 7, but this will depend on the workpiece material. The buffer salts and indicators will be chosen accordingly. This bath has two important features: first, it will keep the temperature of the system constant and will buffer any change in temperatures during the process; and secondly, any failure in the pumping system where the corrosive and dangerous polishing solution leaks out will be immediately noticed and neutralized.
5. An acid/base indicator may be added to the bath. It is used to detect leakage at the connections and to ensure the bath is neutralizing the polishing chemistry. In a more complicated set-up, the bath may be be equipped with several chemical detectors to detect leakage too, such as pH sensors, ion selective electrodes, etc.
6. Once the temperature of the workpiece 1 is equilibrated with the temperature of the buffer bath 30, the polishing chemistry solution may be pumped F from a chemical polishing solution bath 34 through the inlet tubing using a pump 36 and apparatus as shown in FIG. 5.
7. The pump 36 may be a constant volumetric flow pump such as that provided by a piston pump.
8. The outlet tubing may be immersed into a secondary bath 38 to capture the effluent, making it harmless by dilution and/or neutralization. As an alternative method the effluent can be recirculated to the solution bath 34 using a valve 42 to control recirculation.
9. The rate of pumping is preferably set at a high enough volumetric flow such that no gas collects in the cavity and the interior walls of the cavity are uniformly covered with chemistry that is essentially at the same concentration and temperature throughout the cavity.
10. The chemical polishing solution in the solution bath 34 is maintained at a constant temperature for that specific working polishing solution (it will vary depending on the alloy). This may require heating of the solution or alternatively cooling to below ambient using heating and stirring plate 40.
11. If a constant volumetric flow pump 36 is used, the degree of finishing can be detected by measuring certain flow parameters. Since partially melted powder from the AM process and the support cavities will be removed faster than a smooth surface, the rate of change of the parameters will change at a faster rate initially, but then dramatically decrease as the loosely held and/or partially melted powder and/or the support structures are removed. There are several methods of monitoring this, but not limited to:
    a) Measuring the differential pressure between the inlet and outlet using pressure sensors 44, 46.
    b) Measuring the flow rate through the cavity.
    c) Measuring the concentration of the chemical polishing solution components, or the dissolved alloy components, at the outlet.
12. The degree of finishing can also be determined with non-destructive direct inspection using, but limited to:
    a) Borescope
    b) 3D X-ray CT inspection
    c) Ultrasonic imaging Process Determination Methods:
Method I
1. Assume that the surface texture of the interior surfaces is no greater than twice that of the exterior surface, for example the $S_{dr}$ (Developed Interfacial Area Ratio) of the interior vs the exterior. It may be greater than the exterior, depending on the size of the cavity and supports structures. For cavities greater than approximately 3 mm, its "ceiling" may have more partially melted powder and the cavity may also have support structures.
2. The nominal interior and exterior surface areas are known from the 3D model.
3. Experimentally determine the amount of stock removed per volume of polishing solution. This can be done by:
    a. Obtain a test specimen made by the same AM process. e.g., 20 mm×20 mm×5 mm rectangle
    b. Make a chemical polishing solution with a concentration close to a not-working formulation (this will be vary per chemical polishing solution)
    c. Place 50 mL of that chemical polishing solution in a Teflon beaker and set it up to the specific working temperature for that chemical polishing solution.
    d. Dip the test specimen in the polishing solution beaker until the chemistry is exhausted.
    e. Measure the amount of stock removed.
    f. If more stock removal is required to attain the required surface finish, repeat the process with the specimen until another 50 mL of fresh chemistry is exhausted.
    g. Repeat as necessary until maximum finishing has been reached.
    h. From this easy experimental set-up one can calculate the stock removal/unit area/volume of chemistry.
    i. Knowing the surface area of the cavity, the volume of polishing chemistry required to finish the cavity can be easily calculated.
4. Make tight seals at the openings to the cavity with tubing.
5. Immerse the part in a liquid bath with tubing connections to the openings and let the workpiece temperature equilibrate with the bath.
6. Recirculate the calculated volume of the polishing chemistry, at its working temperature, through the cavity at a high enough rate so that bubble formation is not an issue.
7. Recirculate the chemistry until it is exhausted.

Method II
1. Obtain a test specimen made by the same AM process. e.g., 20 mm×20 mm×5 mm rectangle.
2. Dip the test specimen in a volume of polishing chemistry large enough such that its concentration and temperature essentially stays constant.
3. Measure the time necessary to reach the required surface finish.
4. Now pump the solution through the cavity using the same procedure as in Method I for one to two times (tacking into account the removal of the support structures in the interior of the cavity) the duration to finish the test specimen in Step 1.
5. If the cavity size is smaller than 3 mm, the cavity's interior should be finished in the same time as that measured in Step 3.
6. If the cavity is larger than 3 mm, then the cavity will have more partially melted powder on the ceiling and support structure. Therefore, it is advisable to process the part for twice the time measured in Step 3.

Method III
1. The partially melted/sintered powder and/or temporary support structures in a cavity increases the pressure drop across the cavity as chemistry is pumped through it.
2. As chemistry is pumped through, the flow rate will increase and the pressure drop will decrease during finishing as the partially melted powder and support structures are removed.
3. The rate of change in pressure drop or flow rate will slow down after the partially melted powder is removed.
4. The pressure or flow rate can be measured with a pressure transducer at the inlet and a flow meter, respectively. It is also possible to measure the differential pressure at the inlet and outlet with a differential pressure transducer.
5. A constant flow pump pumps chemistry through the cavity.
6. The process is stopped when the rate of change significantly drops.

Method IV
1. The metal debris will be dissolved in the internal cavity as the polishing chemistry is pumped through it.
2. As the polishing chemistry is pumped through, the concentration of the dissolved alloy and their byproducts will increase as the partially melted powder and support structures are removed.
3. The concentration of the alloys and/or polishing reaction byproducts can be measured with a chemical sensor.
4. A constant increase of metal alloy and/or polishing reaction byproducts concentration is indicative of the dissolution of the metal debris on the cavity and surface finishing process.

5. The process is stopped when the concentration of the metal alloy and/or polishing reaction byproducts drops and reaches a constant plateau.

Method V

1. Specialized instrumentation inspection systems, such as 3D X-ray CT and/or borescope and/or ultrasonic imaging, can also be used to monitor the surface integrity of the surface of AM interior cavities.
2. If the actual surface area can be measured accurately, then the time to pump fresh chemistry through the cavity can be calculated to remove the partially melted powder and/or support structure.
3. Alternatively, if the inspection system is available at the chemical polishing site, then the pumping can done incrementally with inspections done to determine the extent of surface finishing.

In each case, processing of the external surface of the component may take place, if required, prior to or after the finishing of the internal cavities. To this end, the internal cavities may be stoppered to prevent ingress of polishing solution and the whole component may then be processed in a processing bath, with or without media (abrasive or non-abrasive) by otherwise conventional methods. This may use the same chemical polishing solution as used for the internal cavity or a different solution. Post-processing of the external surface of the component may also assist in removing any remains of the connector.

The present invention has been described above with reference to a number of exemplary embodiments as shown in the drawings. Modifications and alternative implementations of some parts or elements are possible, and are included in the scope of protection as defined in the appended claims.

The invention claimed is:

1. A method for chemical processing an internal cavity of an additive manufactured (AM) metal workpiece, the method comprising:
    (a) providing an AM metal workpiece having an internal cavity, with an internal surface exhibiting metal debris, excess surface roughness, or temporary support structures;
    (b) providing at least a first connector in fluid-tight connection with the internal cavity; and
    (c) circulating a chemical polishing solution from an external reservoir through the first connector and the internal cavity and back to the external reservoir, to process the internal cavity to a desired finish and remove the metal debris, excess surface roughness, or temporary support structures,
    wherein the chemical polishing solution is capable of chemically reacting with the metal of the AM metal workpiece,
    wherein the workpiece is immersed in a bath during flowing of the chemical polishing solution through the internal cavity, the bath having liquid and being configured to maintain the workpiece at a constant temperature during flowing of the chemical polishing solution.
2. The method according to claim 1, wherein providing the first connector in fluid-tight connection with the internal cavity comprises aligning a bore of the first connector with an opening to the internal cavity and temporarily adhering the first connector to the workpiece.
3. The method according to claim 2, wherein aligning the bore with the opening to the internal cavity comprises providing an alignment extension made from a soluble polymer that fits into the opening to ensure correct alignment into the cavity.
4. The method according to claim 1, wherein providing the first connector in fluid-tight connection with the internal cavity comprises providing the first connector on a connection jacket having a shape to fit around the workpiece and sealing the first connector to an opening to the internal cavity.
5. The method according to claim 4, wherein the connection jacket is manufactured by additive manufacturing.
6. The method according to claim 1, further comprising providing a second connector in fluid-tight connection with the internal cavity and flowing the chemical polishing solution through the first connector into the internal cavity and out through the second connector.
7. The method according to claim 6, wherein the internal cavity is a blind hole and the first and second connectors are integrated to provide flow to and from the blind hole.
8. The method according to claim 1, wherein the bath is provided with an indicator or equipped with detectors to detect leakage of chemical polishing solution from the internal cavity.
9. The method according to claim 1, wherein the chemical polishing solution is flowed through the internal cavity at a rate that is sufficient to avoid localized bubble formation.
10. The method according to claim 1, wherein after the desired finish is achieved, the first connector is removed.
11. The method according to claim 1, further comprising sealing the internal cavity to prevent entry of chemical polishing solution and performing chemical processing of an external surface of the workpiece.
12. The method of claim 1, wherein the AM metal workpiece is selected from the group consisting of: jet engine fuel nozzles, nozzles, atomizers, impellers, propellers, rotor assemblies, turbine blades, exhaust manifolds, exhaust pipes, gas diffusers, flow manifolds, flow valve manifolds, stationary serpentine passages, heat exchangers, pipe elbows, coil pipes, and mandrels having internal passages with cross-sectional areas of less than 1 mm$^2$.
13. A method for chemical processing an internal cavity of an additive manufactured (AM) metal workpiece, the method comprising:
    (a) providing an AM metal workpiece having an internal cavity, with an internal surface exhibiting metal debris, excess surface roughness, or temporary support structures;
    (b) providing at least a first connector in fluid-tight connection with the internal cavity; and
    (c) flowing a chemical polishing solution through the first connector and the internal cavity to process the internal cavity to a desired finish and remove the metal debris, excess surface roughness, or temporary support structures,
    wherein the chemical polishing solution is capable of chemically reacting with the metal of the AM metal workpiece,
    wherein the workpiece is immersed in a bath during flowing of the chemical polishing solution through the internal cavity, the bath having liquid and being configured to maintain the workpiece at a constant temperature during flowing of the chemical polishing solution, and
    wherein the desired finish is determined by non-destructive direct inspection using: a borescope; 3D X-ray CT inspection; or ultrasonic imaging.

14. The method according to claim 13, wherein the defined finish is determined by monitoring a parameter of the flowed solution selected from the group consisting of: measuring the differential pressure between the inlet and outlet; measuring the flow rate through the cavity; measuring the concentration of the chemical polishing solution components at the outlet; and measuring the concentration of the dissolved alloy components at the outlet.

15. A method for chemical processing an internal cavity of an additive manufactured (AM) metal workpiece, the method comprising:
   (a) providing an AM metal workpiece having an internal cavity, with an internal surface exhibiting metal debris, excess surface roughness, or temporary support structures;
   (b) providing at least a first connector in fluid-tight connection with the internal cavity; and
   (c) flowing a chemical polishing solution through the first connector and the internal cavity to process the internal cavity to a desired finish and remove the metal debris, excess surface roughness, or temporary support structures, wherein the chemical polishing solution is capable of chemically reacting with the metal of the AM metal workpiece, wherein the workpiece is immersed in a bath during flowing of the chemical polishing solution through the internal cavity, the bath having liquid and being configured to maintain the workpiece at a constant temperature during flowing of the chemical polishing solution, and wherein an amount of chemical polishing solution required to achieve a desired finish is calculated and the amount is flowed through the internal cavity until the chemical polishing solution is exhausted.

* * * * *